United States Patent [19]

Fitzburgh

[11] Patent Number: 5,967,337

[45] Date of Patent: Oct. 19, 1999

[54] APPARATUS AND SYSTEM FOR STORAGE OF RECORDING MEDIA STORAGE DEVICES AND THE LIKE

[76] Inventor: Brian P. Fitzburgh, 2965 Waverly Dr., Apt. #2, Sun Valley, Calif. 90039

[21] Appl. No.: 08/769,581

[22] Filed: Dec. 18, 1996

[51] Int. Cl.[6] ....................................................... A47F 5/00
[52] U.S. Cl. ............................ 211/40; 211/41.12; 211/46; 248/222.12
[58] Field of Search .................................. 211/40, 41.12, 211/46; 206/308.1; 248/214, 311.2, 222.12

[56] References Cited

U.S. PATENT DOCUMENTS

| | | | |
|---|---|---|---|
| 3,274,450 | 9/1966 | Siebold | 248/222.12 X |
| 3,298,530 | 1/1967 | Clouthier | 211/40 |
| 3,310,178 | 3/1967 | Wright | 211/40 |
| 3,323,847 | 6/1967 | Clouthier | 211/41.12 |
| 3,746,180 | 7/1973 | Spiroch et al. | 211/40 X |
| 4,648,514 | 3/1987 | Niles | 211/41.12 |
| 4,658,966 | 4/1987 | Broek | 211/46 |
| 5,044,588 | 9/1991 | Gunter | 248/214 |
| 5,295,622 | 3/1994 | Lorber | 211/46 X |
| 5,622,270 | 4/1997 | Bezos | 211/41.12 X |

*Primary Examiner*—Robert W. Gibson, Jr.
*Attorney, Agent, or Firm*—Hopgood, Calimafde, Kalil & Judlowe

[57] ABSTRACT

The invention relates to a storage structure and hook system for securing recording media storage devices and the like. According to one aspect of the invention, the structure comprises a plurality of parallel pairs of elongated members, mounted and stacked end-to-end in a rectangular box-like configuration, at least one base parallel pair of members having a parallel extension member connected by like members at corresponding ends, and each disk being housed in a relatively flat, rectangular container with at least one slot at a selected side edge adjacent a corner thereof and suitably configured for reception of a mounting adapter, the adapter including a hook and a base, the hook being configured for engaging one of the members so as to suspend the container freely therefrom and the base being relatively smaller in width than the hook, the base including an arrangement of opposing notched prongs which, when compressed, allows ready passage into the slot and, upon expansion, readily engages interior edges of the slot so as to affix the adapter to the container, the base penetrating the container interior minimally.

8 Claims, 11 Drawing Sheets

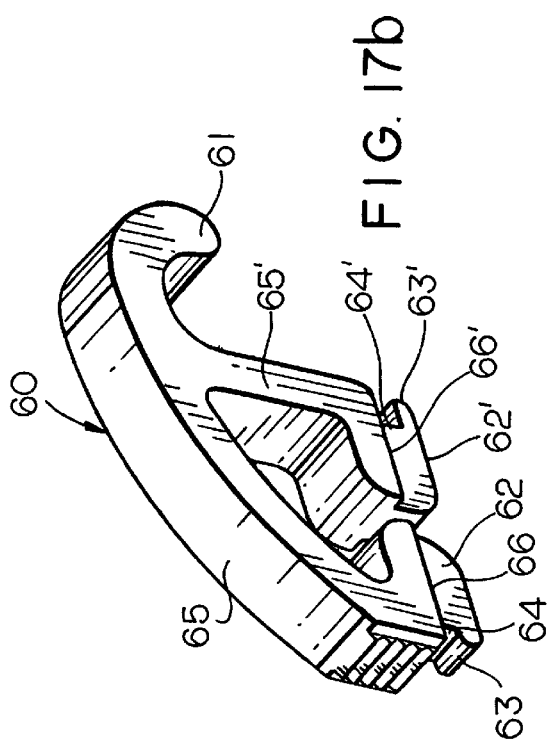
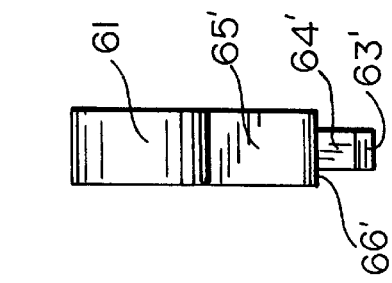
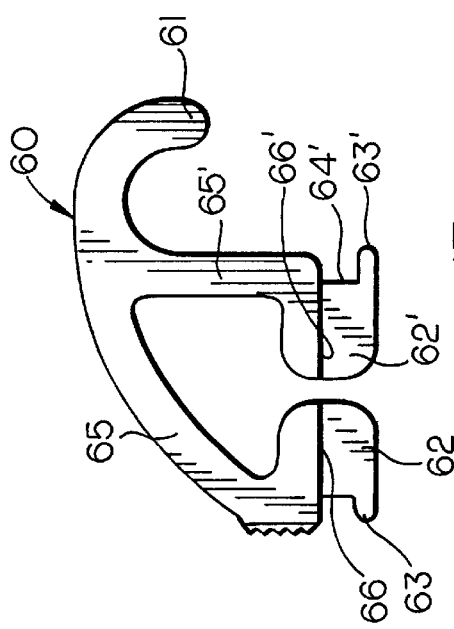
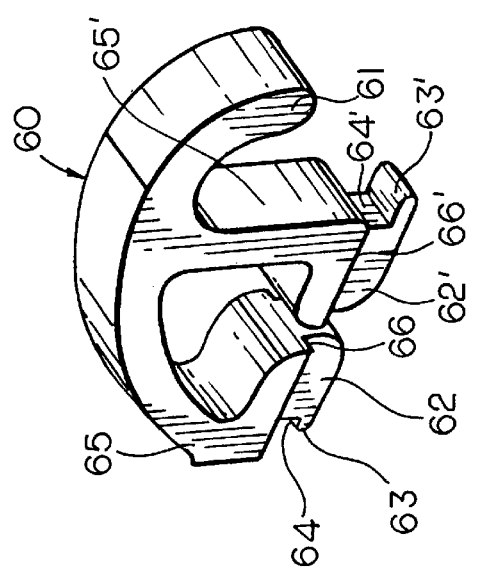
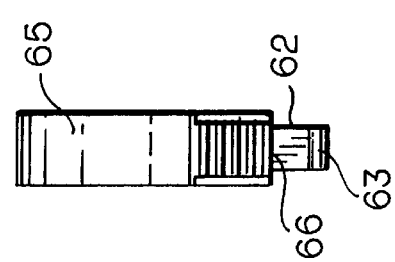

APPARATUS AND SYSTEM FOR STORAGE OF RECORDING MEDIA STORAGE DEVICES AND THE LIKE

FIELD OF THE INVENTION

The present invention relates generally to devices for organizing and retaining recording media storage devices and more particularly to an apparatus and system for enhancing storage of compact discs, minidiskettes, video tapes or the like.

BACKGROUND OF THE INVENTION

In the wake of increasing miniaturization of computer technology, difficulties persist in storage of recording media storage devices. Conventional storage apparatus include simple structures such as racks on which compact discs, videotapes, or the like are placed. Various geometries have been utilized, ranging from simple rectangular structures to fixed or rotisserie circular towers.

An objective is to locate a maximum number of devices in a practically sized and proportioned structure, without sacrificing device accessibility. It is also desirable to simultaneously provide devices at least some degree of protection from moisture, undesirable temperatures, electromagnetic and other wave conditions, and breakage. A further objective is to provide a storage system which is readily adapted to existing media storage devices.

SUMMARY OF THE INVENTION

In accordance with one aspect of the present invention, there is provided, in combination, a storage structure and hook system for securing recording media storage devices and the like. The structure comprises a plurality of elongated member pairs, a first of the member pairs being arranged generally parallel to one another and connected by a second parallel member pair, the first and second pair being perpendicular to one another and joined end-to-end so as to form substantially a rectangle. A third parallel member pair are generally perpendicular to and between the first and located a selected distance between the second and third pairs so as to permit reception of recording media storage devices. To complete the structure, each of at least one member pair of the rectangle has a pair of member legs generally perpendicular thereto, the corresponding distal ends of each leg pair being joined by a relatively horizontal base leg.

In accordance with another aspect of the present invention, there is provided, in combination, a storage structure and hook system for securing recording media storage devices and the like. The structure comprises a plurality of parallel pairs of elongated members, mounted and stacked end-to-end in a rectangular box-like configuration. Completing the structure is at least one base parallel pair of members having a parallel extension member connected by like members at corresponding ends. Each disk is housed in a relatively flat, rectangular container with at least one slot at a selected side edge adjacent a corner thereof and suitably configured for reception of a mounting adapter. The adapter includes a hook and a base, the hook being configured for engaging one of the members so as to suspend the container freely therefrom. The base is relatively smaller in width than the hook, and includes an arrangement of opposing notched prongs which, when compressed, allow ready passage into the slot and, upon expansion, readily engage interior edges of the slot so as to affix the adapter to the container, the base penetrating the container interior minimally.

The present invention is also directed to a method of mounting a recording media storage device to a storage structure, the structure comprising a plurality of parallel pairs of elongated members, mounted and stacked end-to-end in a rectangular box-like configuration, at least one base parallel pair of the members having a parallel extension member connected by like members at corresponding ends so as to complete the structure, the method comprising the steps of:

(i) mounting an adapter to a relatively flat, rectangular container for housing the disk, the container having at least one slot at a selected side edge adjacent a corner thereof and suitably configured for reception of a mounting adapter; the adapter including a hook and a base, the hook being configured for engaging one of the members so as to suspend the container freely therefrom and the base being relatively smaller in width than the hook, the base including an arrangement of opposing notched prongs which, when compressed, allow ready passage into the slot and, upon expansion, readily engage interior edges of the slot so as to affix the adapter to the container, the base penetrating the container interior minimally; and (ii) engaging the hook with the structure so as to suspend the container freely therefrom.

The present invention is further directed to a method of mounting a media storage disk to a storage structure which comprises a plurality of elongated member pairs, a first of the member pairs being arranged generally parallel to one another and connected by a second parallel member pair, the first and second pair being generally perpendicular to one another and joined end-to-end so as to form substantially a rectangle, and a third parallel member pair, perpendicular to and between the first, and at a selected distance between the second and third pairs for receiving recording media storage devices, each of at least one member pair of the rectangle having a pair of member legs generally perpendicular thereto, the corresponding distal ends of each leg pair being joined by a relatively horizontal base leg so as to complete the structure, the method comprising the steps of:

(i) mounting an adapter to a relatively flat, rectangular container for housing the disk, the container having at least one slot at a selected side edge adjacent a corner thereof and suitably configured for reception of a mounting adapter; the adapter including a hook and a base, the hook being configured for engaging one of the members so as to suspend the container freely therefrom and the base being relatively smaller in width than the hook, the base including an arrangement of opposing notched prongs which, when compressed, allow ready passage into the slot and, upon expansion, readily engage interior edges of the slot so as to affix the adapter to the container, the base penetrating the container interior minimally; and (ii) engaging the hook with the structure so as to suspend the container freely therefrom.

The present invention is, in addition, directed to an adapter for engaging a relatively flat, rectangular disk container with a recording media device storage structure, the container having at least one slot at a selected side edge adjacent a corner thereof suitably configured for reception of a mounting adapter. The adapter includes a hook and a base, the hook being configured for engaging one of the members so as to freely suspend the container therefrom. The base being relatively smaller in width than the hook, and includes an arrangement of opposing notched prongs which, when compressed, allow ready passage into the slot and, upon expansion, readily engage interior edges of the slot so as to affix the adapter to the container, the base penetrating the container interior minimally.

Accordingly, it is an object of the present invention to improve storage of recording media storage devices and the like.

Another object of the present invention is to locate a maximum number of devices into a practically sized and proportioned structure, without sacrificing disk accessibility.

Yet another object of the present invention is to provide recording media storage devices and the like at least some degree of protection from moisture, undesirable temperatures, electromagnetic or other wave conditions, and breakage.

A further object of the present invention is to provide a storage system which is durable and readily adapted to existing storage media devices and the like.

Still another object of the present invention is to provide a simple, economical and reliable apparatus, system and method for securing media devices and the like.

Yet a further object of the present invention is an apparatus, system and method for storing recording media storage devices and the like, which may be adapted to a variety of recording media storage device sizes and configurations.

The present invention will now be further described by reference to the following drawings which are not to be deemed limitative in any manner thereof.

BRIEF DESCRIPTION OF THE DRAWINGS

FIG. 17a is a forward perspective view of a mounting adapter in accordance with one aspect of the present invention;

FIG. 17b is a rear perspective view of the adapter of FIG. 17a;

FIG. 17c is a plan view of the adapter of FIG. 17a;

FIG. 17d is an end view of the adapter of FIG. 17a;

FIG. 17e is an enlarged view of section A of FIG. 17a;

FIG. 19b is a plan view of the minidiskette container shown in FIG. 19a; and

FIG. 19c is a plan view of the minidiskette shown in FIG. 19a.

The same numerals are used throughout the various figures of the drawings to designate similar parts. Still other objects and advantages of the present invention will become apparent from the following description of the preferred embodiments.

DETAILED DESCRIPTION OF THE PREFERRED EMBODIMENTS

Figure 1:
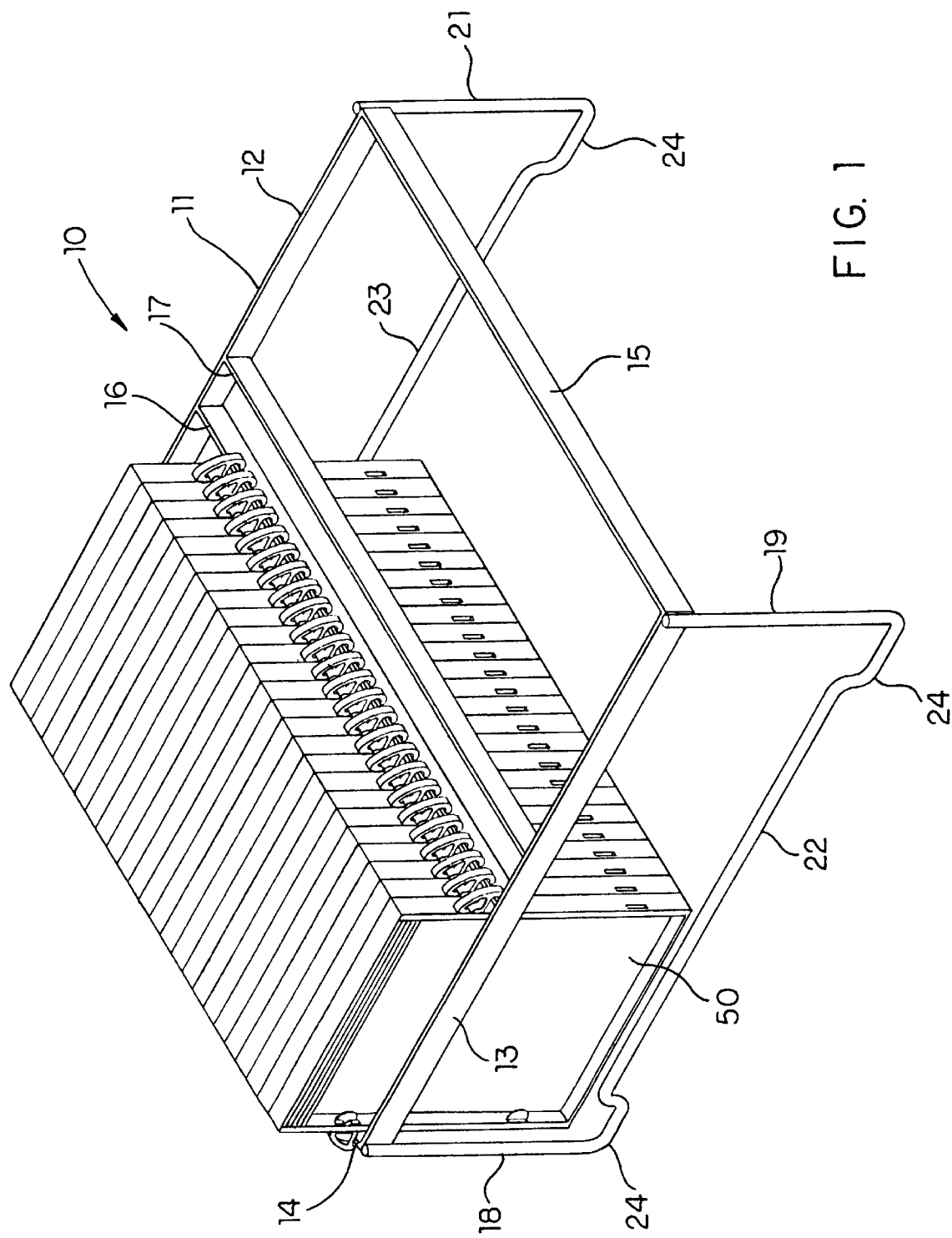
FIG. 1 is a perspective view of an apparatus for storage of recording media storage devices filled partially with devices, in accordance with one aspect of the present invention.
Figure 2:
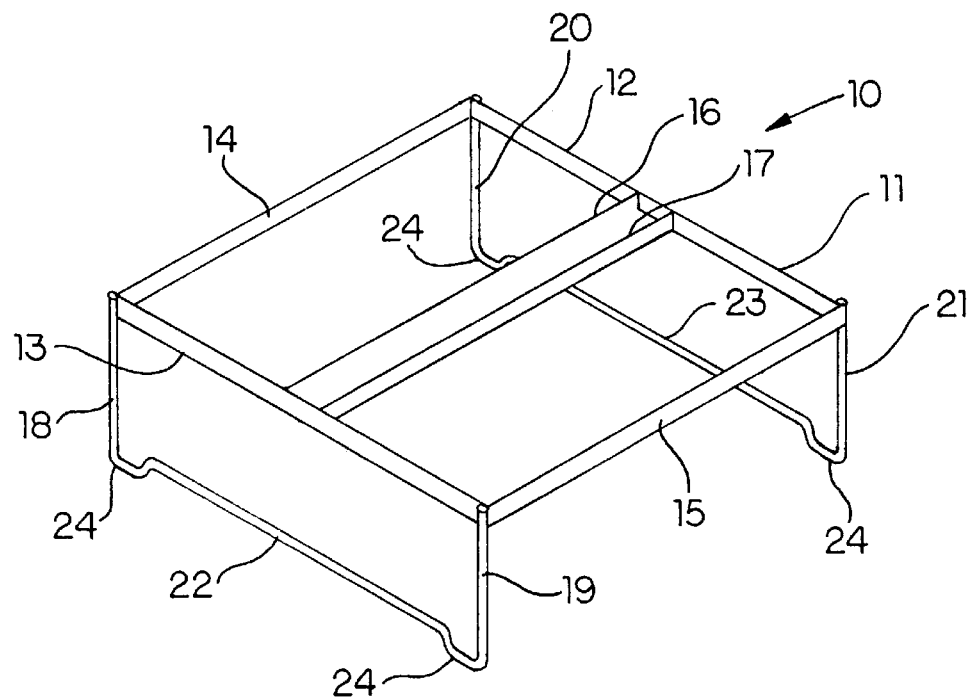
FIG. 2 is a perspective view of the apparatus of FIG. 1 without devices.
Figure 3:
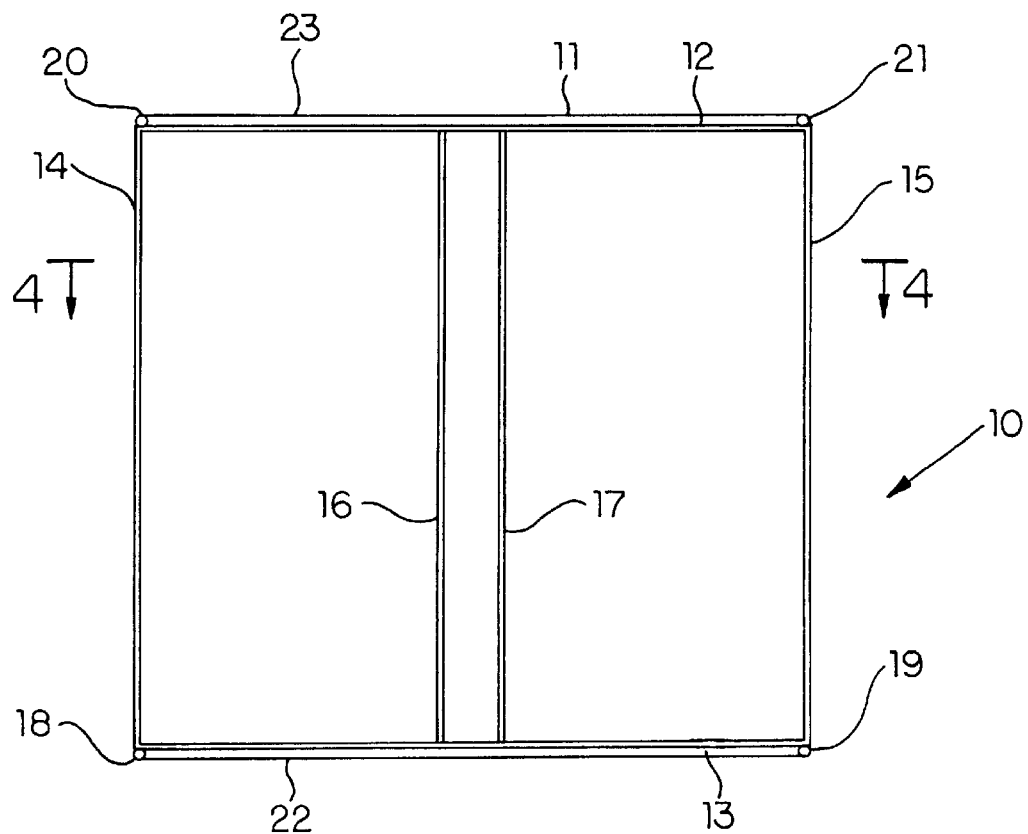
FIG. 3 is a plan view of the apparatus of FIG. 2.
Figure 4:
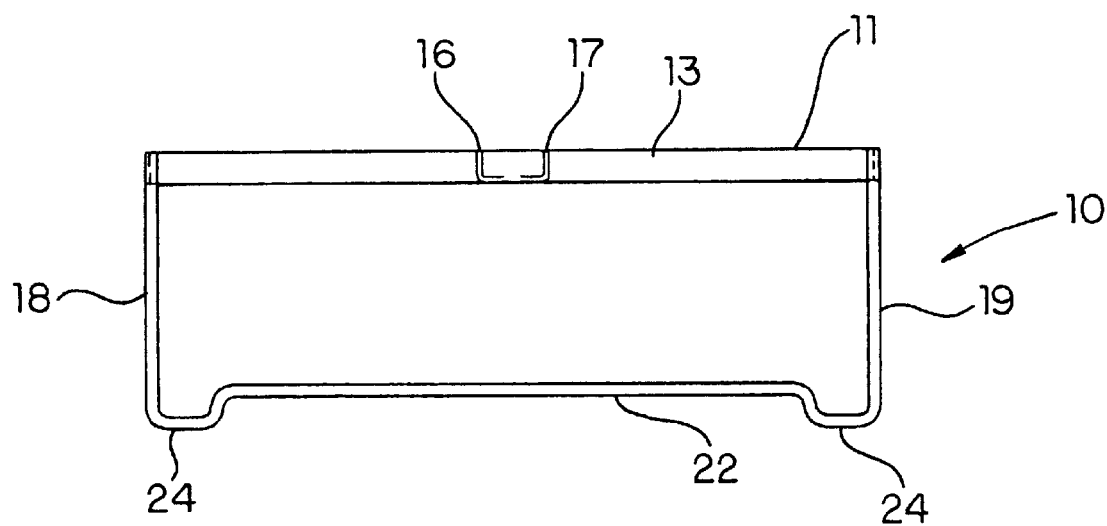
FIG. 4 is a sectional view taken along line 4—4 of FIG. 3.
Figure 5:
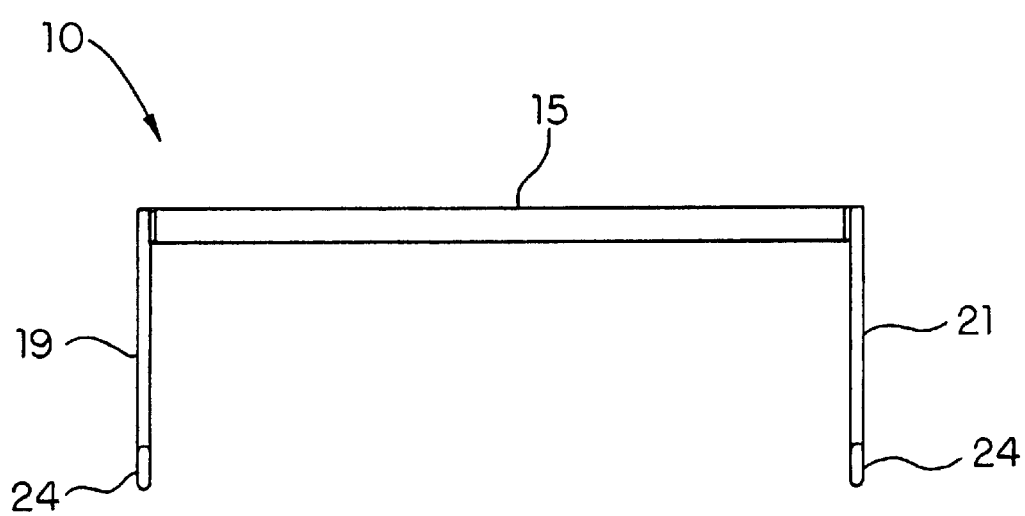
FIG. 5 is a side view of the apparatus of FIG. 2.

FIGS. 1–18 illustrate generally an apparatus and system for storing recording media storage devices and the like, in accordance with various aspects of the present invention. According to one aspect of the present invention, as shown in FIGS. 1–6, there is provided a combination storage structure and hook system 10 for securing recording media storage devices 30 and the like.

Generally speaking, the system comprises a structure 11 having a plurality of elongated member pairs 12, 13, 14, 15, 16, 17 mounted end-to-end in a rectangular configuration. In particular, the first of the member pairs 12, 13 are generally parallel to one another and connected by a second parallel member pair 14, 15, the first and second pair being arranged perpendicular to one another and joined end-to-end so as to substantially form a rectangle. A third parallel member pair 16, 17 is perpendicular to and between the first and at a selected distance between the second and third pairs so as to permit reception of recording media storage devices 30. To complete the structure, each of at least one member pair of the rectangle has a pair of member legs 18, 19, 20 and 21, generally perpendicular thereto, the corresponding distal ends of each leg pair being joined by a relatively horizontal base leg 22, 23.

Alternatively or concurrently therewith, the base leg has feet 24 formed therein, e.g., one adjacent the ends of each leg, for support of the system in an upright position.

Figure 8:
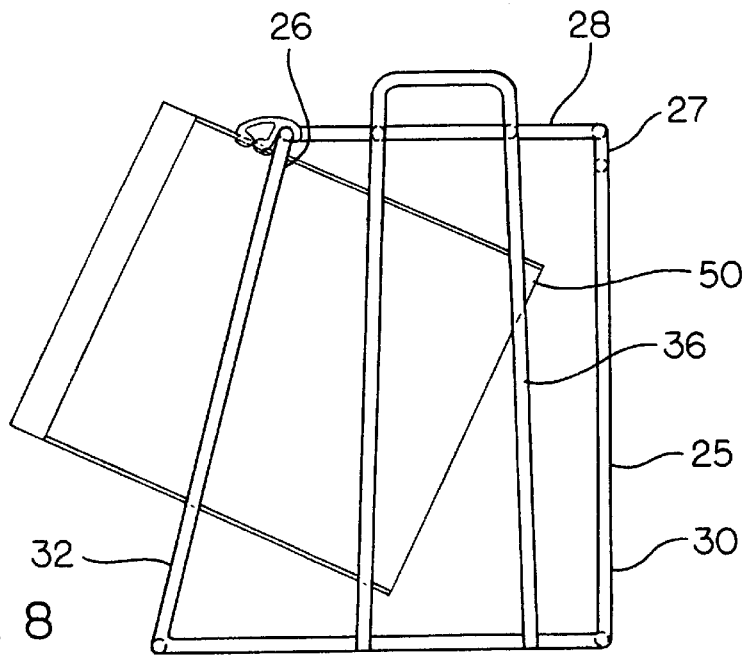
FIG. 8 is a side view of the apparatus of FIG. 7.
Figure 9:
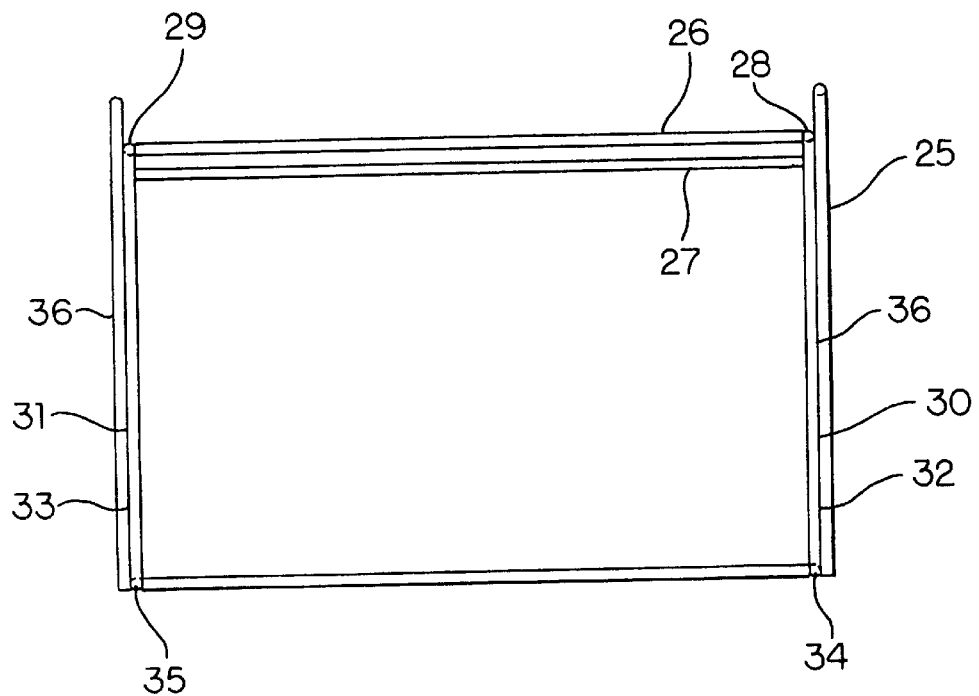
FIG. 9 is a front view of the apparatus of FIG. 7 without devices.
Figure 10:
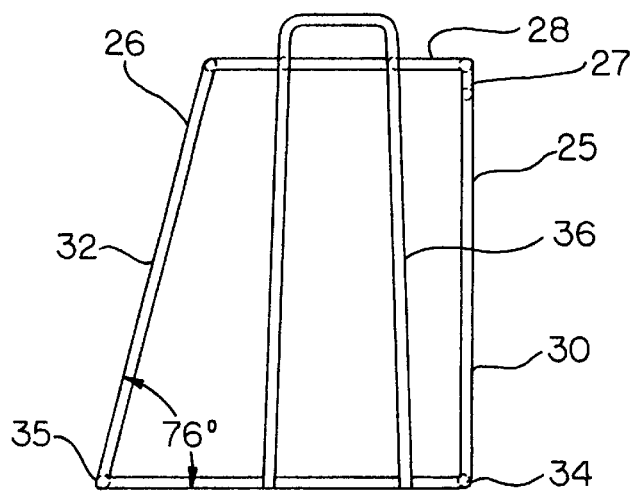
FIG. 10 is a side view of the apparatus of FIG. 9.
Figure 11:
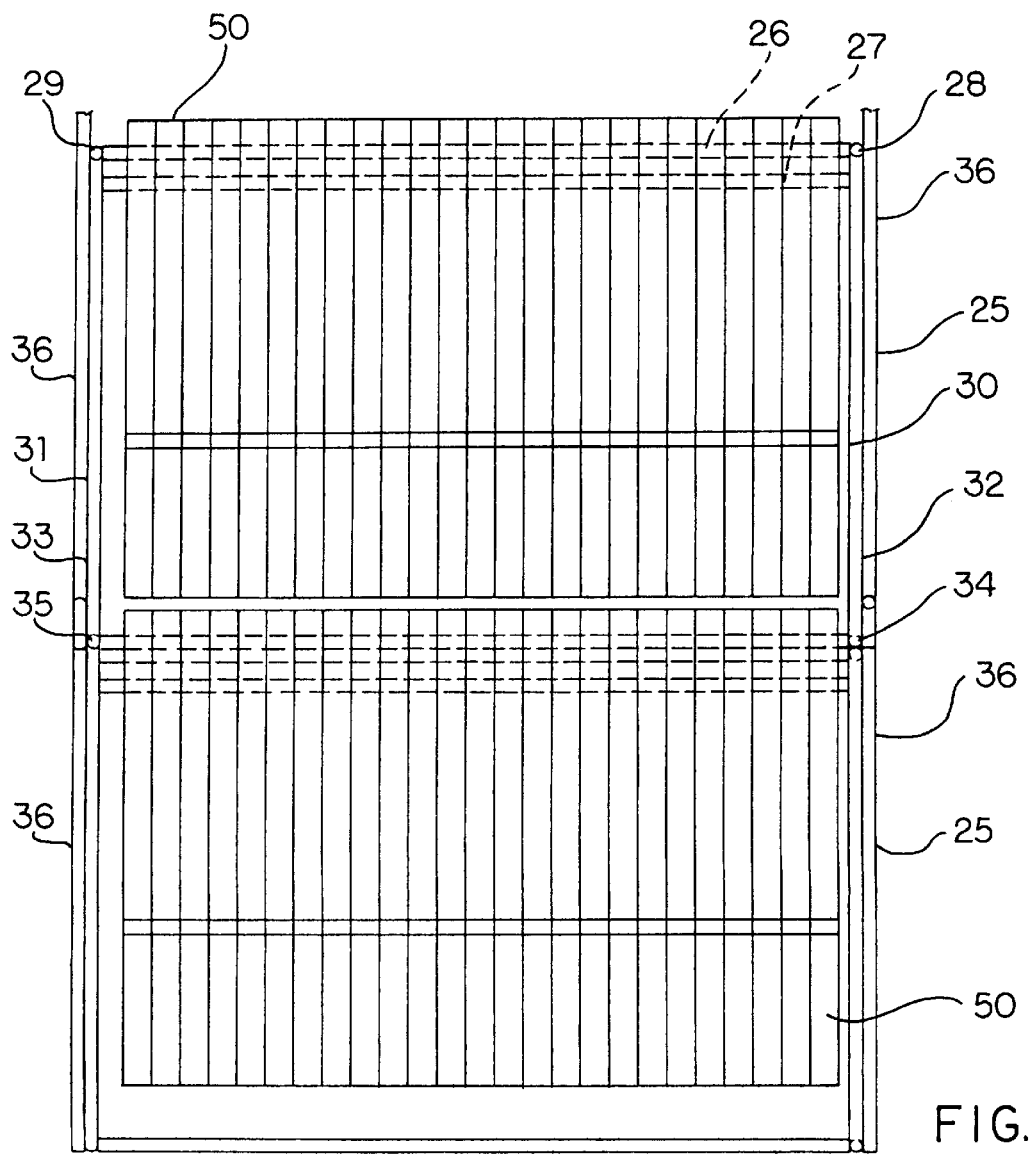
FIG. 11 is a front view of an apparatus for storage of recording media storage devices filled with devices, in accordance with a further aspect of the present invention.
Figure 12:
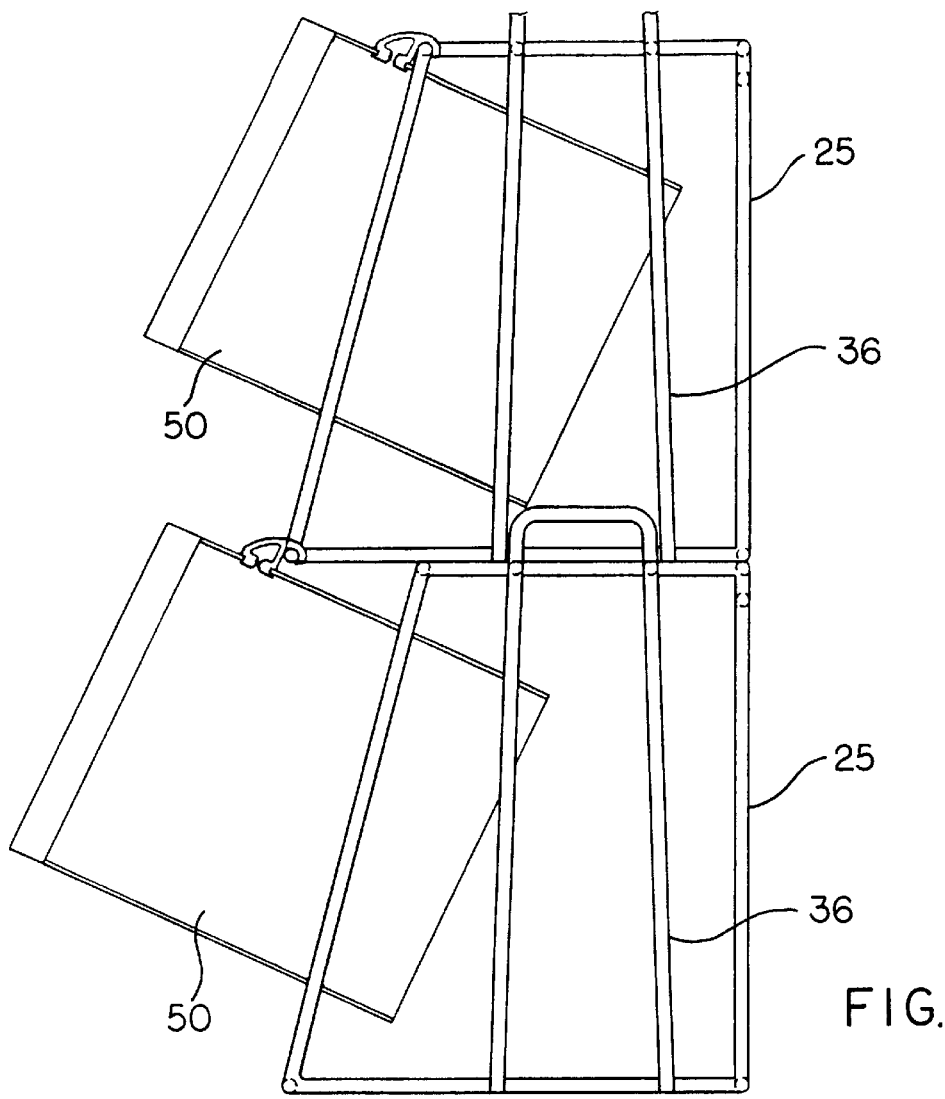
FIG. 12 is a side view of the apparatus of FIG. 11.
Figure 13:
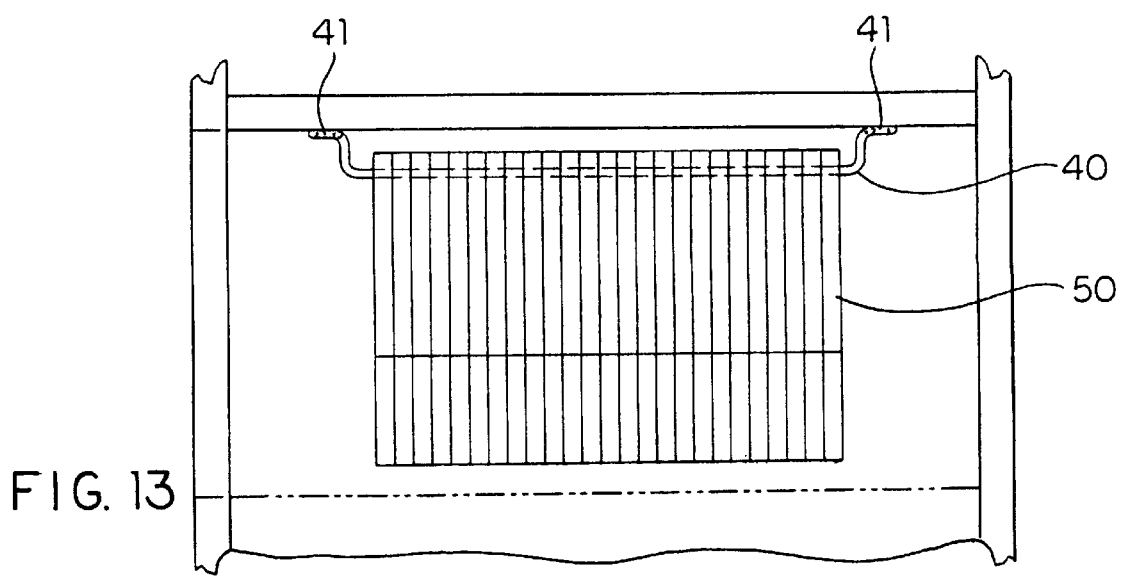
FIG. 13 is a front view of an apparatus for storage of recording media storage devices filled with devices, in accordance with yet another aspect of the present invention.

In accordance with another aspect of the present invention is a structure 25 having a plurality of elongated member pairs 26–35 mounted end-to-end in a trapezoidal configuration, as set forth in FIGS. 7–10. In particular, the first of the member pairs 26, 27 are generally parallel to one another and connected by a second parallel member pair 28, 29, the first and second pair being arranged perpendicular to one another and joined end-to-end so as to substantially form a rectangle. Each first and second pair mounts at the connecting ends of member legs 30, 31, 32, 33, the corresponding distal ends of the legs being joined by relatively horizontal base legs 34, 35. To complete the structure, the first leg pair 30, 31 is generally perpendicular to the corresponding member pairs, whereas the second leg pair 32, 33 are offset at an obtuse angle therefrom, e.g., 104 degrees. In addition, U-shaped reinforcements 36 are mounted centrally to opposing-side open faces of the structure, as best seen in FIGS. 8 and 10.

Alternatively or concurrently therewith, the foregoing structure may be suitably adapted for stacking one upon another, e.g., two or more structures, within the spirit and scope of the present invention. An illustrative arrangement is shown generally in FIGS. 11–12.

Figure 14:
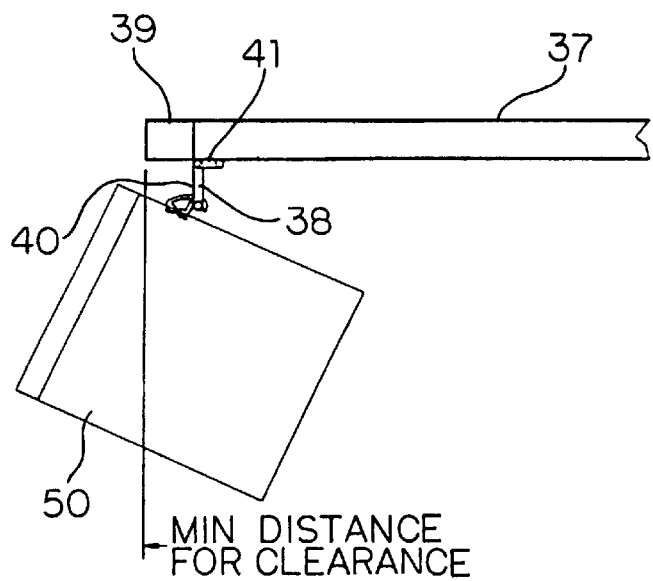
FIG. 14 is a side view of the apparatus of FIG. 13.
Figure 15:
FIG. 15 is a plan view of a horizontal support member of FIG. 13.
Figure 16:
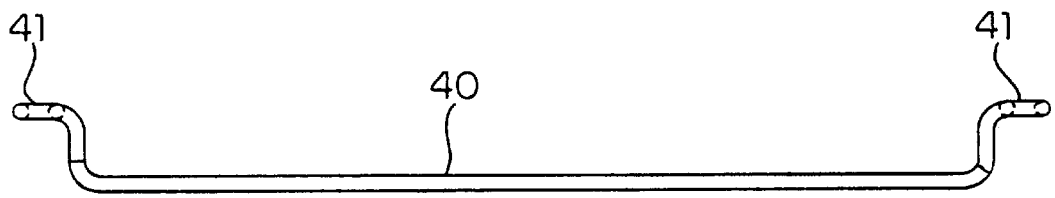
FIG. 16 is a side view of the support member of FIG. 15.

In a further embodiment, as set forth in FIG. 14, a simple structure is used comprising a cantilever beam member 37 mounting a hook adapter 38 in proximity to the outbound end 39, the distance between the adapter and mounting surface of the beam member corresponding to a selected minimum clearance. This clearance will necessarily vary giving consideration to the dimensions of the recording media storage device supported from the adapter. A simple bar member 40, as shown in FIGS. 15–16, having looped ends 41 has been found suitable for suspending a plurality of media storage devices.

Figure 18:
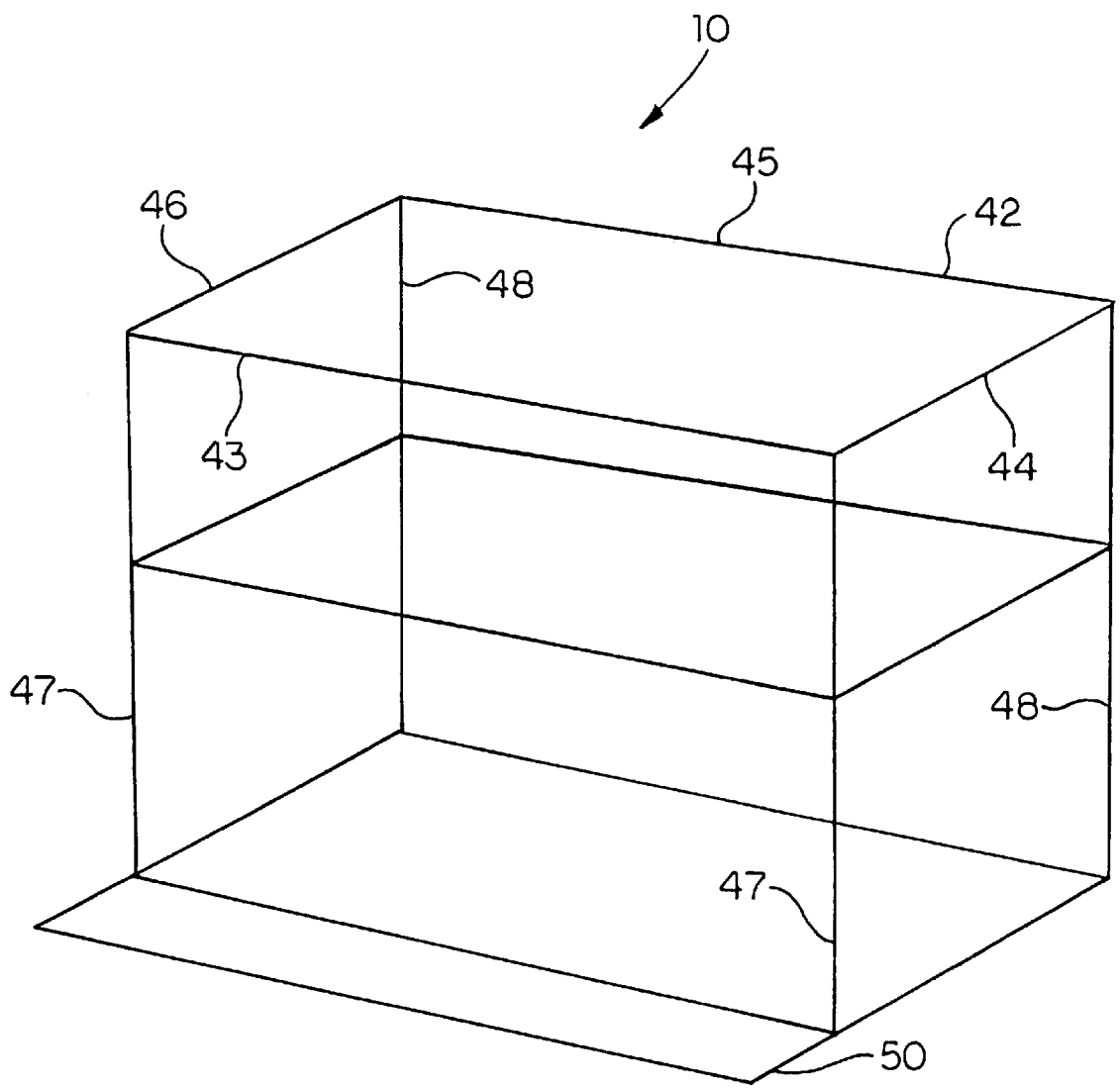
FIG. 18 is a perspective view of an apparatus for storage of recording devices without disks, in accordance with yet a further aspect of the present invention.

According to yet another aspect of the present invention is a structure 42 having a plurality of parallel pairs of elongated members 43, 44, 45, 46, mounted and stacked end-to-end in a rectangular box-like configuration. Each of at least one member pair of the rectangle has a pair of member legs 47, 48 generally perpendicular thereto, the corresponding distal ends of each leg pair being joined by a relatively horizontal base leg 49. At least one base parallel pair of members has an extension 50 generally parallel thereto and connected by like members at the corresponding ends. A structure of this general configuration is shown in FIG. 18.

It is preferred that a wire frame construction be used for maximum storage capability, plated or painted for improved appearance and protection. Also, a simple wire frame has been found suitable for mounting to the underside of a shelf, thereby converting previously unused space to a storage facility for recording media devices or the like.

According to one aspect of the present invention, the various structures provide a first selected storage capacity, e.g., 25 jewel boxes, when located on a fixed horizontal surface such as a table top. A second selected storage capacity approximately double that of the first, e.g., 50 jewel boxes, is provided by the structure when mounted to a fixed vertical surface such as a wall.

While the present invention is shown and described in connection with a rectangular structure, those skilled in the art will appreciate that other geometries or configurations may also be utilized, without departing from the spirit and scope of the present invention.

Figure 6:
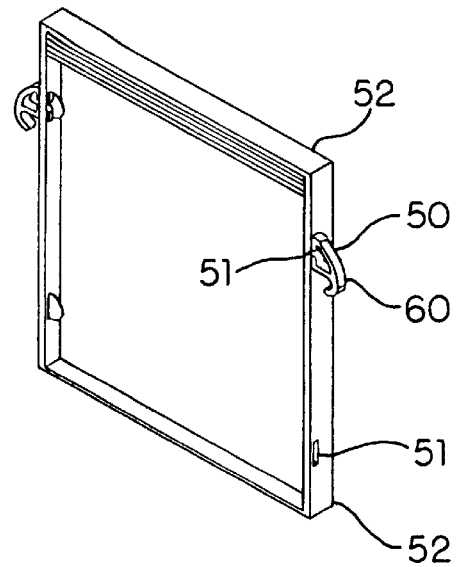
FIG. 6 is a perspective view of a recording media storage disk of FIG. 1.
Figure 7:
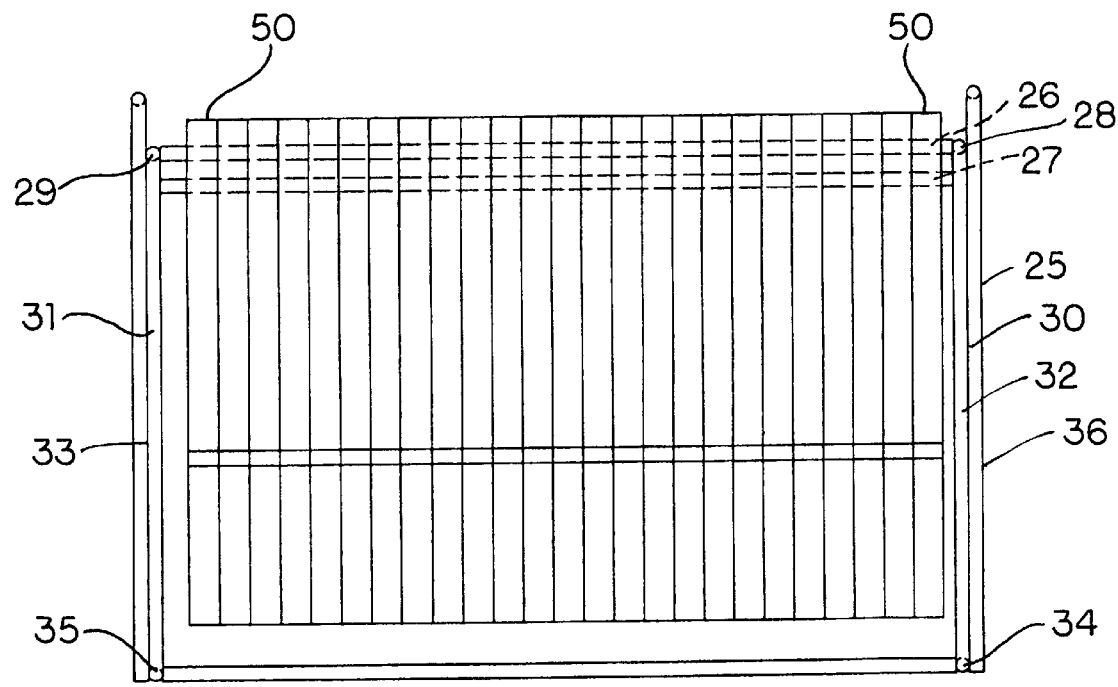
FIG. 7 is a front view of an apparatus for storage of recording media storage devices filled with devices, in accordance with another aspect of the present invention.

As shown in FIG. 6, each disk, e.g., a CD, minidiskette or the like, is housed in a relatively flat, rectangular container 50 such as a jewel box with at least one slot 51 at a selected side edge panel 52 adjacent a corner thereof, and suitably configured for reception of a disk mounting adapter 60.

At least one adapter 60 is mounted to each container 50 and preferably includes a arcuate hook 61 and base elements 62, 62', as shown in FIGS. 17a–17e, the hook being configured for engaging one of the members, e.g., 17, 27, 44, so as to suspend the container freely from the structure without becoming dislodged easily. In this connection, it is desired that the base elements be proportionately smaller in width than the hook. The base elements includes an arrangement of opposing prongs 63, 63' which, when compressed, allow passage into slot 51 and, upon expansion, engage interior edges of longitudinal ends 53, 53' of the slot so as to affix the hook assembly to the structure.

This adapter configuration is advantageous not only in enhancing disk storage, but also provides quick and simple snap-in engagement and removal from the container. The use of a base with two arm prong arrangement each with a conservative notch 64, as opposed to a fish hook prong with deep or pronounced notches, lends significantly greater ease to installation. This shallow base design also decreases substantially the likelihood of damage to the adapter or the slot upon abrupt application of forces to either (e.g., if the jewel box or its supporting structure is dropped).

Preferably, the base penetrates the container interior minimally upon engagement, e.g., about $\frac{1}{32}$ inch deep, to avoid contact with artwork and/or other documents typically stored in the container with the disk. It has been found that relatively deep engagement with the interior, where the artwork is thick such as in the case of an instruction booklet, can result in difficulty closing the container or otherwise prevent the artwork from being stored as intended.

The conventional location of each slot 51, in a jewel box of the character shown, is off-center for the elongate side-edge panel in which the slot (or slots) is formed. This fact is particularly beneficial for container suspension via the hook of installed adapter 60, lending added stability to the hanging of a jewel box.

More specifically, and as shown, the adapter 60 is seen to be configured for resilient snap-in engagement to and removal from a side-edge panel 52 of a rectangular jewel box 50 or the like for storage of a compact disc or the like, wherein the container has a relatively thin-walled side-edge panel 52 with at least one elongate rectangular slot opening 51 of length exceeding its width, and of depth equal to the thickness of the panel (52). Said adapter 60 comprises a unitary structure of two compliantly bendable prong-arm elements 65, 65', which are connected to each other at one end of said arm elements, with the arcuate hook formation 61 extending outwardly from the connected end of the arm elements. Said arm elements 65, 65' in unstressed condition define confronting prong-tip base elements 62, 62' which are in spaced coplanar relation and which are of thickness to permit insertional entry to clear the width dimension of the edge-panel slot of the jewel box 50 or the like. Said prong-tip base elements 62, 62' in unstressed condition have an overall span which exceeds the length dimension of the slot but which in compressionally squeezed reduction of said span allows passage of the opposing prong-tip base elements into the slot; and each of said base elements has a longitudinally outwardly open slot or notch formation 64, 64' of width adapted upon release of the compression, to establish located engagement of said adapter-base elements to the container at the respective longitudinal ends of the slot.

Further, it is seen from FIGS. 17a–17d that (i) if the width of prong-arm and hook elements (65, 65', 61) exceeds the relatively narrow width of the prong-tip base elements 62, 62', and (ii) if the base elements 62, 62' are centrally located with respect to the greater width of the prong-arm and hook elements, then longitudinal shoulders 66, 66' are defined on the alignment of the upper side of the respective notches 64, 64' of the prong-tip base elements 62, 62'. These shoulders 66, 66' overlap the respective lateral margins of the slot and enable stabilized seating of the adapter when released for its snap-in engagement to the side-edge panel 52 of the container.

In accordance with another aspect of the present invention, the adapter includes a hook and a base, the base being applied with an adhesive, e.g., tape or the like, for mounting the adapter to the container and, in turn, the container to at least one storage structure member so as to suspend the container freely therefrom. According to a further aspect of the present invention, the container and mounting adapter are integrated as a one piece unit, e.g., the adapter and hook being formed in the container. Yet another aspect of the present invention is a clip-on adapter which snaps around the outside diameter of the container.

In an alternative embodiment, the adapter is formed or molded integrally with the container. With this and other applications, the adapter is preferably constructed of a flexible, durable polymeric material or the like, in keeping with the purpose for which the present invention is intended.

Although the present invention is shown and described in connection with compact discs, those skilled in the art will appreciate its adaptability to other storage devices without departing from the spirit and scope of the present invention. For example, the present invention may be adapted for use alternatively or concurrently with minidiskettes, audio cassette tapes, VCR, and/or 8 mm video tapes in accordance with the present invention.

Figure 19A:
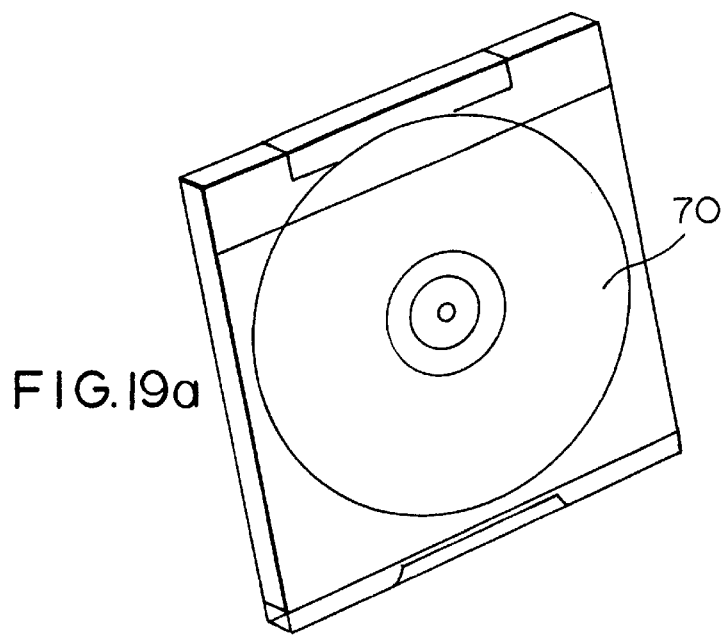
FIG. 19a is a perspective view of a minidiskette-type media storage device.
Figure 19B:
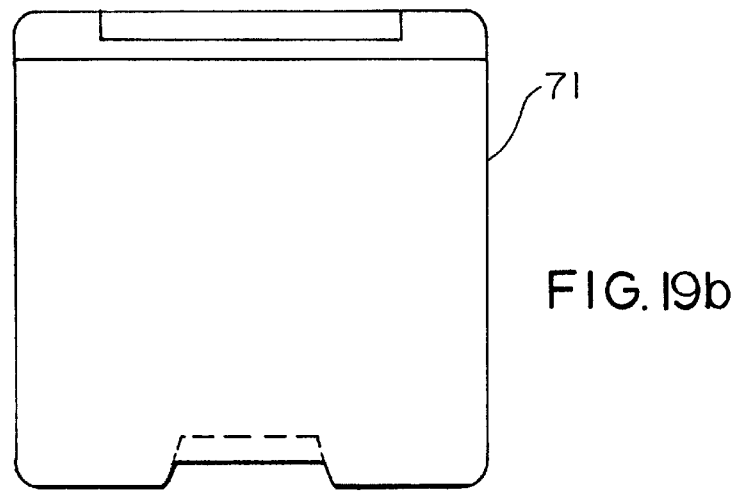
Figure 19C:
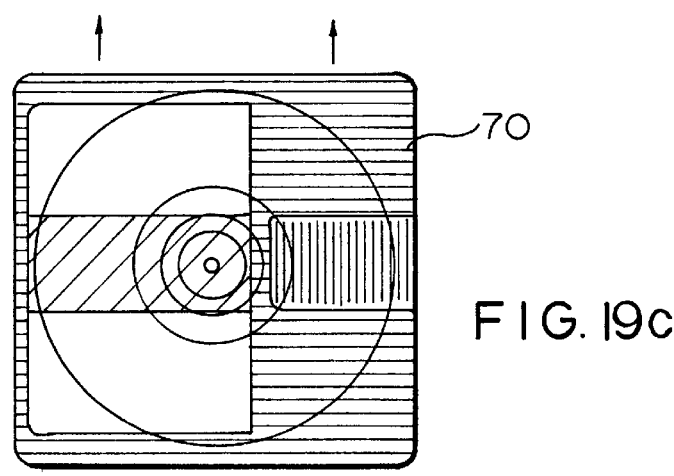

In one embodiment, minidiskettes 70 are suspended by an adapter and hook arrangement. In existing minidiskettes, as shown in FIGS. 19A–19C, the adapter is mounted to the minidiskette containers 71 by a suitable adhesive.

According to still another aspect of the present invention, at least two adapters are mounted to each jewel box, e.g., on opposing parallel sides, such that the jewel box engages two corresponding members of the structure like a hanging file. A first selected storage capacity is provided in each of two rows or levels of the structure, e.g., 25 jewel boxes in each row for a total of 50 jewel boxes. This structure is suitable for placement in a conventional filing cabinet, desk drawer, or on a table top.

The present invention is also directed to a method of mounting a media storage disk to a storage structure. The method comprises the steps of engaging the adapter with a slot of a relatively flat, rectangular container for housing the disk, and engaging the adapter with the structure so as to suspend the container freely therefrom.

More particularly, the method comprises the steps of mounting the adapter to a relatively flat, rectangular container for housing the disk, the container again having at least one slot at a selected side edge adjacent a corner thereof suitably configured for reception of a mounting adapter. The adapter includes a hook and a base, the hook being configured for engaging one of the members so as to suspend the container freely therefrom and the base being relatively smaller in width than the hook. The base includes an arrangement of opposing prongs which, when compressed, allow passage into the slot and, upon expansion, engage interior edges of the slot so as to affix the hook assembly to the container. The next step is engaging the hook with the structure so as to suspend the container freely therefrom.

This method is further directed to mounting a media storage disk to a storage structure which comprises a plurality of elongated member pairs. The first of the member pairs are arranged generally parallel to one another and connected by a second parallel member pair. The first and second pair are perpendicular to one another and joined end-to-end so as to substantially form a rectangle. The third parallel member pair perpendicular to and between the first and at a selected distance between the second and third pairs for receiving recording media storage devices. Each of at least one member pair of the rectangle have a pair of member legs generally perpendicular thereto. The corresponding distal ends of each leg pair being joined by a relatively horizontal base legs.

The present invention provides a durable, reliable and inexpensive alternative to disk storage without sacrificing any of the objectives of recording media storage structures.

Since from the foregoing the construction and advantages of the invention may be readily understood, further explanation is believed unnecessary. However, since numerous modifications will readily occur to those skilled in the art after consider-tin of the foregoing specification and accompanying drawings, it is not intended that the invention be limited to the exact construction shown and described, but all suitable modifications and equivalents may be resorted to which fall within the scope of the appended claims.

What is claimed is:

1. A storage structure and hook system for securing recording media storage devices and the like, the storage structure comprising a plurality of parallel pairs of elongated members, mounted and stacked end-to-end in a rectangular box-like configuration, at least one base parallel pair of members having a parallel extension member connected by like-members at corresponding ends, a mounting adapter including a hook and a base, the hook being configured for engaging one of the members so as to suspend a relatively flat rectangular container for housing a disk with at least one slot at a selected side edge adjacent a corner thereof and suitably configured for reception of the mounting adapter, and the base being relatively smaller in width than the hook, the base including an arrangement of opposing notched prongs which, when compressed, allows ready passage into the slot and, upon expansion, readily engages interior edges of the slot so as to affix the mounting adapter to the container, the base penetrating the container interior minimally.

2. A storage structure and hook system for securing recording media storage devices and the like, the structure comprising, a plurality of elongated member pairs, a first of the member pairs being arranged generally parallel to one another and connected by a second parallel member pair, the first and second pair being perpendicular to one another and joined end-to-end so as to form substantially a rectangle, and a third parallel member pair, generally perpendicular to and located between the first, and located a selected distance between the second pair for receiving recording media storage devices, each of at least one member pair of the rectangle having a pair of member legs generally perpendicular thereto, the corresponding distal ends of each leg pair being joined by a relatively horizontal base leg.

3. The structure and system of claim 2 wherein the base leg has at least one foot formed therein for support of the structure.

4. A method of mounting a media storage disk to a storage structure which comprises a plurality of parallel pairs of elongated members, mounted and stacked end-to-end in a rectangular box-like configuration, at least one base parallel pair of the members having a parallel extension member connected by like members at corresponding ends, so as to complete the structure, the method comprising the steps of:

(i) mounting an adapter to a relatively flat, rectangular container for housing the disk, the container having at least one slot at a selected side edge adjacent a corner thereof and suitably configured for reception of a mounting adapter; the adapter including a hook and a base, the hook being configured for engaging one of the members so as to suspend the container freely therefrom and the base being relatively smaller in width than the hook, the base including an arrangement of opposing notched prongs which, when compressed, allow ready passage into the slot and, upon expansion, readily engage interior edges of the slot so as to affix the adapter to the container, the base penetrating the container interior minimally; and (ii) engaging the hook with the structure so as to suspend the container freely therefrom.

5. A method of mounting a media storage disk to a storage structure which comprises a plurality of elongated member pairs, a first of the member pairs being arranged generally parallel to one another and connected by a second parallel member pair, the first and second pair being generally perpendicular to one another and joined end-to-end so as to form substantially a rectangle, and a third parallel member pair, generally perpendicular to and between the first, and at a selected distance between the second and third pairs for receiving recording media storage devices, each of at least one member pair of the rectangle having a pair of member legs generally perpendicular thereto, the corresponding distal ends of each leg pair being joined by a relatively horizontal base leg, so as to complete the structure, the method comprising the steps of:

(i) mounting an adapter to a relatively flat, rectangular container for housing the disk, the container having at least one slot at a selected side edge adjacent a corner thereof and suitably configured for reception of a mounting adapter; the adapter including a hook and a base, the hook being configured for engaging one of the members so as to suspend the container freely therefrom and the base being relatively smaller in width than the hook, the base including an arrangement of opposing notched prongs which, when compressed, allow ready passage into the slot and, upon expansion, readily engage interior edges of the slot so as to affix the adapter to the container, the base penetrating the container interior minimally; and (ii) engaging the hook with the structure so as to suspend the container freely therefrom.

6. An adapter for engaging a relatively flat, rectangular disk container with a recording media device storage structure, the container having at least one slot at a selected side edge adjacent a corner thereof suitably configured for reception of a mounting adapter, the adapter including a hook and a base, the hook being configured for engaging one of the members so as to suspend freely the container therefrom and the base being relatively smaller in width than the hook, the base including an arrangement of opposing notched prongs which, when compressed, allow ready passage into the slot and, upon expansion, readily engage interior edges of the slot so as to affix the adapter to the container, the base penetrating the container interior minimally.

7. As an article of manufacture, an adapter configured for resilient snap-in engagement to and removal from a side-edge panel of a rectangular jewel box or like container for storage of a compact disc or the like, wherein the container has a relatively thin-walled side-edge panel with at least one elongate rectangular slot opening of length exceeding its width, and of depth equal to the thickness of said panel, said adapter comprising a unitary structure of two compliantly bendable prong-arm elements connected to each other at one end of said arm elements and with an arcuate hook formation extending outwardly from the connected end of said arm elements, said arm elements in unstressed condition defining confronting prong-tip base elements which are in spaced coplanar relation and which are of thickness to permit insertional entry to clear the width dimension of the edge-panel slot of a jewel box or the like container, said prong-tip base elements in unstressed condition having an overall span which exceeds the length dimension of the slot but which in compressionally squeezed reduction of said span allows passage of the opposing prong-tip base elements into the slot, each of said base elements having a longitudinally outwardly open slot or notch formation of width adapted upon release of the compression, to establish located engagement of said adapter base elements to the container at the respective longitudinal ends of the slot.

8. The article of claim 7, wherein the width of the prong-arm and hook elements exceeds the relatively narrow width of the prong-tip base elements, and said base elements are centrally located with respect to the greater width of the prong-arm and hook elements, to define longitudinal shoulders on the alignment of the upper side of the respective notches of the prong-tip base elements, said shoulders overlapping the respective lateral margins of the slot and enabling stabilized seating of the adapter when released for its snap-in engagement to the side-edge panel of the container.

\* \* \* \* \*